Feb. 23, 1926.
C. E. ILER
1,574,094
WINDSHIELD CLEANER
Filed June 17, 1924
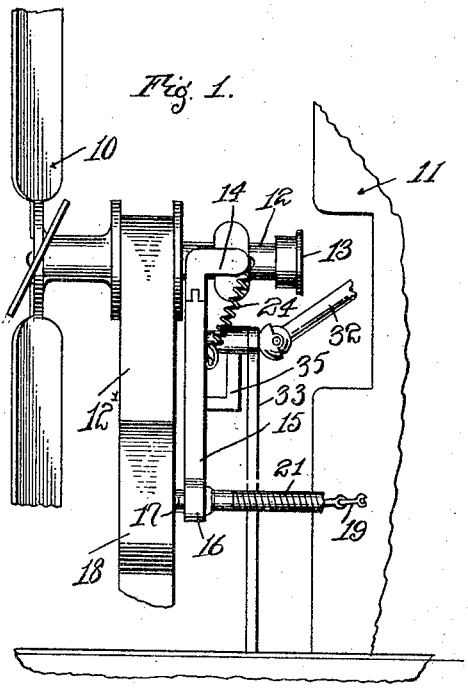
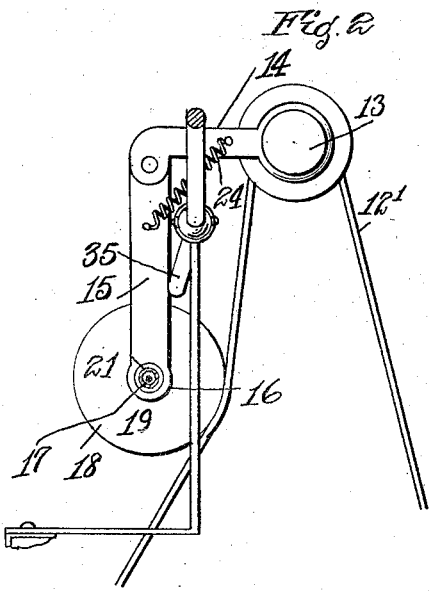
Inventor
Clyde E. Iler.
By
Attorney Patented Feb. 23, 1926.

1,574,094

UNITED STATES PATENT OFFICE.

CLYDE E. ILER, OF AVON, NEW YORK.

WINDSHIELD CLEANER.

Application filed June 17, 1924. Serial No. 720,637.

*To all whom it may concern:*

Be it known that I, CLYDE E. ILER, a citizen of the United States, residing at Avon, in the county of Livingston, State of New York, have invented certain new and useful Improvements in Windshield Cleaners; and I do hereby declare the following to be a full, clear, and exact description of the invention, such as will enable others skilled in the art to which it appertains to make and use the same.

This invention relates to new and useful improvements in cleaning devices, and particularly to devices for cleaning the glass of automobile windshields.

One object of the invention is to provide a novel mechanism whereby the cleaning element may be moved back and forth across the glass, automatically, thus obviating the detracting of the driver's attention, or requiring him to remove his hands from the wheel.

Another object is to provide a device of this character which is simple in construction, and which may be readily applied to an automobile, without modification to the parts of the automobile.

A further object is to provide a device of this character which is adapted to be driven by a moving part of the automobile, thus obviating the provision of any special means for operating the cleaner.

Other objects and advantages will be apparent from the following description when taken in connection with the accompanying drawing.

In the drawing:

Figure 1 is a side elevation of a portion of the invention which is associated with the fan wheel of the automobile.

Figure 2 is an elevation as viewed from the rear of the fan of the automobile, the wheel being engaged with the fan belt.

Referring particularly to the accompanying drawing, 10 represents the fan of the automobile engine 11, and 12 the shaft of said fan, which has the usual nut 13 thereon. The apertured end of an arm 14 is engaged on the fan shaft 12, and is retained thereon by the said nut 13. This arm extends radially from the shaft, then at right angles to the attached portion of the arm, in the direction of the fan belt 12', and thence at right angles downwardly, where it is pivotally connected with the upper end of a vertical member 15. The lower end of this member 15 is formed with a bearing eye 16 which rotatably receives the shaft 17, and fixed on one end of this shaft is a wheel 18, which is arranged to bear against the outer face of the fan belt 12', and to be rotatably operated thereby. The other end of the shaft 17 is threaded and has engaged thereon the adjacent end of a flexible shaft 19, which extends rearwardly to the dashboard, and thence upwardly to a point at the upper portion of the windshield 20, of the automobile. Covering this flexible shaft 19 is a tubular casing 21, one end of which is secured to the side of the bearing eye 16, and the other end secured to a plate 22, which is carried by the upper portion of the frame of the windshield, in front of the driver's seat. Connected at one end to the member 15, and at its other end to a stationary portion of the hood 23, of the automobile, is a spring 24, which urges the wheel 18 into firm contact with the fan belt 12'.

Pivotally mounted on the plate 22, and depending therefrom, outwardly of the glass of the windshield, is an arm 25, to which is secured a longitudinally extending strip of rubber, or other material 26, which bears against the outer face of the glass of the windshield. Carried by the other end of the pivot of the arm 25 is an outwardly flared plate 27, the outer end of which is arcuate, as shown at 28, and formed in this outer end is an endless elongated toothed rack 29, which is engaged by a gear 30, carried by the adjacent end of the flexible shaft 19.

Extending longitudinally of the engine 11, and having one end rotatably supported in a suitable bearing 31, in the dashboard, or instrument board, of the automobile, is a rod 32, the other end of which is suitably supported in a bracket 33 carried at the rear of the radiator. The end of the rod which extends through the instrument board is provided with a knob 34 which is adapted to be grasped to rotate the rod, while the other end portion is provided with a radially extending arm 35 engaged with the member 15, in such position that upon rotating the rod in one direction, said arm 35 will swing the member 15 outwardly to disengage the wheel 18 from the belt, and thereby throw the cleaner out of operation.

The operation of the device is as follows:

The rod 32 having been rotated to permit the wheel 18 to rest against the fan belt 14, and the fan being in motion, the wheel 18 will turn, and transmit such movement, through the flexible shaft 19, to the gear 30. This end of the flexible shaft being relatively stationary, the teeth of the gear 30 will cause the rack 29 to travel thereon, with the result that the plate 27 will oscillate in a vertical plane, on the plate 22, and being fixed to the pivot of the depending arm 25, will cause said arm to swing, back and forth, across the glass of the windshield, with the result that the rubber strip 26 will effectively clean the said glass. This motion of the arm 25 will continue as long as the wheel 18 engages with the fan belt 14, but should it be desired to stop the operation of the cleaner, the driver rotates the rod 32 so as to cause the arm 35 to swing the wheel 18 away from the fan belt.

Suitable means, such as the notches 36, in the bearing 31, engaged by the lug 37, on the knob 34, serves to maintain the rod 32 against accidental rotation, when once set in position to permit the wheel 18 to bear against the fan belt, or to hold the wheel away from the belt.

There is thus provided a simple and cheap means for automatically operating a windshield cleaner, which relieves the operator from the ordinary constant manipulation of the cleaner across the glass. Furthermore, the device is applicable to an automobile without any modifications thereto, except the bearing for the upper end of the rod 32, and the support for the lower end thereof. The arm which supports the wheel 18 is held on the fan shaft by the nut which forms a part of the fan equipment.

What is claimed is:

A power transmitting device, in combination with a power shaft and its supporting bracket, of a clamp mounted on the bracket, a depending arm movably mounted on the clamp, the power shaft having a belt, a belt engageable wheel on the outer end of the depending arm, a spring between the arm and clamp whereby to normally maintain the wheel engaged with the belt, a standard adjacent the arm, a rock shaft carried by the standard, means for rocking the shaft, and a radial arm on the rock shaft disposed for engagement with the depending arm whereby to swing said arm and disengage the wheel from the belt.

In testimony whereof, I affix my signature.

CLYDE E. ILER.